United States Patent [19]

Keuper et al.

[11] Patent Number: 5,284,029
[45] Date of Patent: Feb. 8, 1994

[54] TRIPLE EFFECT ABSORPTION HEAT EXCHANGER COMBINING SECOND CYCLE GENERATOR AND FIRST CYCLE ABSORBER

[75] Inventors: Edward F. Keuper, La Crosse, Wis.; William J. Plzak, La Crescent, Minn.

[73] Assignee: Gas Research Institute, Chicago, Ill.

[21] Appl. No.: 945,021

[22] Filed: Sep. 15, 1992

[51] Int. Cl.$^5$ .............................................. F25B 15/00
[52] U.S. Cl. ........................................ 62/476; 62/101; 62/79
[58] Field of Search ................... 62/476, 101, 79, 335

[56] References Cited

U.S. PATENT DOCUMENTS

| | | | |
|---|---|---|---|
| 2,196,911 | 4/1940 | Getaz | 62/476 |
| 2,729,952 | 7/1956 | Whitlow | 62/119 |
| 3,323,323 | 6/1967 | Phillips | 62/476 |
| 3,483,710 | 12/1969 | Bearint | 62/79 |
| 4,018,583 | 4/1977 | Patnode et al. | 62/101 |
| 4,531,374 | 7/1985 | Alefeld | 62/79 |
| 4,542,628 | 9/1985 | Sarkisian et al. | 62/335 |
| 4,545,217 | 10/1985 | Nakao et al. | 62/476 |
| 4,732,008 | 3/1988 | De Vault | 62/79 |
| 5,097,676 | 3/1992 | Erickson | 62/476 |

OTHER PUBLICATIONS

Evaluation of a Commercial Advanced Absorption Heat Pump Breadboard, Proceedings of the 2nd DOE/ORNL heat pump conference (CONF-8804100), Modahl & Hayes, p. 117.

Primary Examiner—Henry A. Bennett
Assistant Examiner—William C. Doerrler
Attorney, Agent, or Firm—McAndrews, Held & Malloy, Ltd.

[57] ABSTRACT

Triple-effect absorption heat exchange apparatus for transferring heat from a heat load to a heat sink. The apparatus comprises first and second interconnected refrigerant loops. The first loop comprises a first generator, a first condenser, a first evaporator, and a first absorber operatively linked together. The second loop comprises a second generator, a second condenser, a second evaporator, and a second absorber operatively linked together. The first absorber and the first condenser are in direct heat exchange relation with the second generator. This direct heat exchange relation may be established by providing a two-stage generator in which the condenser and absorber of a first loop are in the same vessel as the generator of a second loop. The condenser and absorber of the first loop provide the heat necessary to operate the second-loop generator. The preferred generator comprises a first vessel divided by a partition into first and second chambers and at least one second vessel made of a heat-conductive media. The first and second vessels are in heat exchange contact across the medium. Each second vessel has an entrance and an exit, is unobstructed between its entrance and its exit, and passes through the first chambers vessels.

26 Claims, 3 Drawing Sheets

TRIPLE EFFECT ABSORPTION HEAT EXCHANGER COMBINING SECOND CYCLE GENERATOR AND FIRST CYCLE ABSORBER

FIELD OF THE INVENTION

This invention relates generally to absorption heat exchange apparatus for removing heat from a heat load to a heat sink, and particularly to plural-loop absorption heat exchange apparatus.

BACKGROUND OF THE INVENTION

Absorption refrigeration, chilling, heat pump, and related apparatus employing a composite refrigerant and a single refrigeration loop is well known. The refrigeration loop includes a generator, a condenser, an evaporator, and an absorber. A variety of composite refrigerant systems can be used is in such apparatus. Two examples are an ammonia/water system and a lithium bromide/water system.

Heat from an external source of energy is added to the composite refrigerant in the generator. The generator heats the composite liquid refrigerant sufficiently to distill out a vapor of the more volatile component or phase of the refrigerant (for example, ammonia vapor in the case of the ammonia/water refrigerant and water in the case of the lithium bromide/water system), leaving a less-volatile component or phase of the refrigerant behind. The less-volatile refrigerant component can either be more concentrated than the composite refrigerant (as when water vapor is distilled out of an aqueous lithium bromide solution) or more dilute than the initial refrigerant (as when ammonia is driven out of water solution). The remaining less-volatile refrigerant component is removed to the absorber.

The condenser receives the vapor phase of the refrigerant from the generator and condenses it to liquid form (also known as a condensate). The heat released by the condensation of the vapor is rejected to a cooling tower, cooling water, some other external heat sink, or another stage of the refrigeration apparatus.

The evaporator withdraws heat from a heat load (i.e. the building air, refrigerator contents, cooling water, or other medium the system is designed to cool) by evaporating the condensed liquid refrigerant in direct or indirect contact with the heat load. The evaporator thus re-vaporizes the volatile refrigerant component.

The absorber contacts the refrigerant vapor component leaving the evaporator with the less-volatile refrigerant component leaving the generator. The contacting process generates heat when the vapor phase is reabsorbed into the less-volatile refrigerant phase. This heat is rejected to a cooling tower, cooling water, another stage of the refrigeration apparatus, or some other heat sink. The original composite refrigerant is re-formed in the absorber, and then is returned to the generator to complete the cycle.

Triple-effect refrigeration apparatus has two separate but interacting refrigeration circuits of the type described above (sometimes respectively known as a high-temperature loop and a low-temperature loop, as a high loop and a low loop, or as a first loop and a second loop). The first and second loops are interconnected so heat is transferred from the absorber and the condenser of the first loop to the generator of the second loop. Both the first loop and the second loop accept heat from the heat load. The second loop rejects heat from its absorber and its condenser to an external heat sink.

In one version of triple-effect apparatus, the first-loop condenser is a coiled pipe disposed within the second-loop generator vessel. In the same apparatus, heat from the first-loop absorber in one vessel is transferred indirectly to the second-loop generator in another vessel. The indirect heat transfer is accomplished via a heat-exchange fluid circulated alternately through a first heat exchanger in the first-loop absorber and a second heat exchanger in the low-temperature generator vessel. The use of separate heat exchangers for the first-loop absorber and the second-loop generator introduces inefficiencies and adds to the cost, complexity, and waste heat generation of the apparatus.

One known generator, which uses steam as a heat source, comprises an outer vessel which is closed at each end and inner vessels which are vertical tubes passing through the outer vessel. Heat supplied to the outer vessel in the form of steam from a source outside the refrigerant loop heats the tubes, and thus the refrigerant within the tubes. The refrigerant is boiled within the tubes, and the vapor and entrained liquid is conveyed upwardly and expelled from the upper ends of the tubes.

An absorber is known in which the less-volatile component of the refrigerant trickles down from coil to coil on the substantially horizontal coils of a heat exchanger as it absorbs the refrigerant vapor leaving the evaporator. The heat exchanger removes the heat resulting from the absorption process. The heat is rejected to a heat sink, such as cooling water.

Accordingly, an object of the present invention is to provide plural-loop absorption refrigeration apparatus which has less operative parts than previous systems.

Another object of the invention is to provide absorption refrigeration apparatus which is more efficient than prior apparatus.

An additional object of the invention is to provide absorption refrigeration apparatus which costs less, weighs less, takes up less space, and wastes less heat than prior apparatus.

Yet another object of the invention is to reduce or eliminate the need to transfer heat from one place to another within plural-loop absorption refrigeration apparatus, apart from transfers inherent in a single refrigeration cycle.

Still another object of the invention is to combine the generator of a lower refrigeration loop, and the absorber of a higher refrigeration loop in one outer vessel.

Other objects of the invention will become evident to one of ordinary skill in the art from consideration of the present disclosure.

SUMMARY OF THE INVENTION

One aspect of the invention is absorption heat exchange apparatus for accepting heat from a heat load. The apparatus comprises first and second interconnected heat exchange loops. The first loop comprises a first generator, a first condenser, a first evaporator, and a first absorber operatively linked together. The second loop comprises a second generator, a second condenser, a second evaporator, and a second absorber operatively linked together. The first absorber and the second generator are in direct heat exchange relation.

A related aspect of the invention is a two-stage, second-loop generator for absorption heat exchange refrigeration apparatus of the type having at least two interfacing refrigeration loops. The condenser and absorber of a first heat-exchange loop are in the same vessel as the new second-stage generator, and directly provide the heat necessary to operate the second-stage generator.

The preferred generator comprises a first vessel divided by a vessel formed from a heat-conductive media passes through said first and second chambers. The first and second vessels partition into first and second chambers. At least one second are in heat exchange contact across the medium. The second vessel has an entrance and an exit, and is unobstructed between its entrance and its exit. The interior of the second vessel functions as a second-stage generator, one of the first and second chambers (typically, the first vessel) functions as a first-stage absorber, and the other of the first and second chambers (typically, the second chamber) functions as a first-stage condenser.

The present invention has several advantages. Its major advantage is that, since the generator of the second loop and the absorber of the first loop are combined in one unit, there is no need for a mechanism to transfer the heat of the first-loop absorber of one vessel into the second-loop generator of another vessel. Instead, the excess heat leaving the first-loop generator is used to heat the second-loop generator. Thus, the invention eliminates several components, and their cost, weight, and space requirements, while providing more efficient refrigeration.

DETAILED DESCRIPTION OF THE INVENTION

While the invention will be described in connection with one or more preferred embodiments, it will be understood that the invention is not limited to those embodiments. On the contrary, the, invention includes all alternatives, modifications, and equivalents as may be included within the spirit and scope of the appended claims.

The identity of the refrigerant is not part of the present invention, so in the present description no particular refrigerant will be referred to. One of ordinary skill in the art is aware of refrigerant systems useful in the present apparatus. The same refrigerant system or different refrigerant systems may be used in the respective loops of the apparatus.

This description refers generically to the components of a typical absorption refrigerant, which are a more volatile component or vapor (which, in liquid form, is sometimes referred to as a condensed vapor) and a less-volatile component. These components may coexist as a solution, they may be separated by applying heat to the solution and thus distilling the more volatile component away, and they may be re-combined to reconstitute the solution and reject heat. The vapor may also be condensed to reject heat or vaporized to accept heat. Refrigerants which operate in a different manner, but which may be used in comparable apparatus, are also contemplated for use herein.

Figure 1:
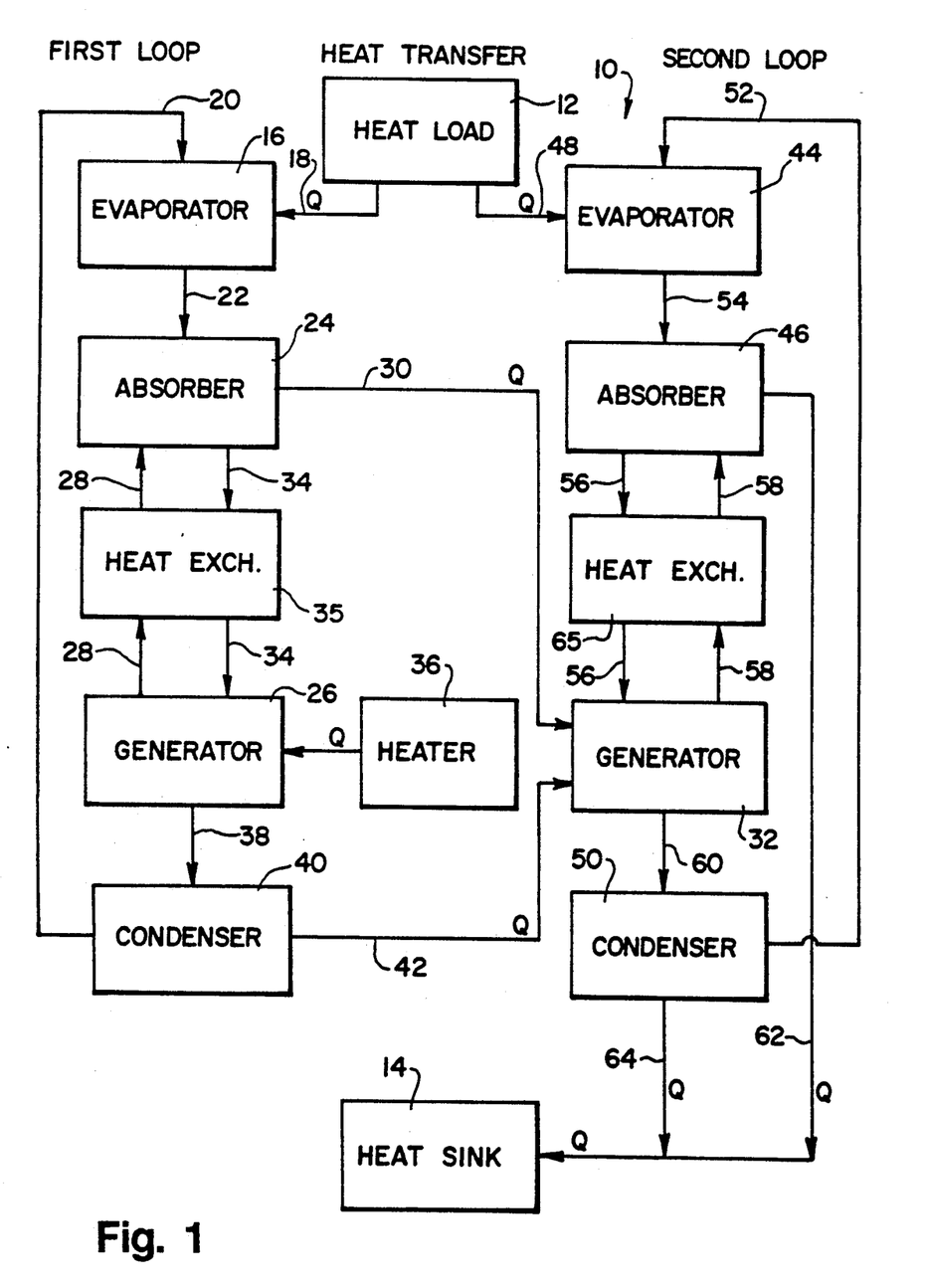
FIG. 1 is a schematic flow diagram of triple-effect absorption heat exchange apparatus according to the present invention.

Referring first to FIG. 1, the heat and refrigerant transfers of a triple-effect refrigeration system are illustrated. The order of the components has been rearranged for clarity. The elements of FIG. 1 are arranged in three columns. The left column relates to the first refrigeration loop; the center column shows the heat sources and the heat sink; and the right column shows the second refrigeration loop.

The system 10 is used to transfer heat from the heat load 12 to the heat sink 14. As is well known, this heat transfer can be carried out whether the heat load 12 is at a higher temperature than, a lower temperature than, or the same temperature as the heat sink 14.

Heat from the load 12 enters the first-loop evaporator 16 of the apparatus via the path 18. (All heat transfers to or from one of the refrigeration loops are represented in FIG. 1 by the letter Q next to an arrow indicating the direction of transfer.) Either the first-loop evaporator 16 is in direct heat-transfer contact with the heat load 12 or heat exchangers connect the first-loop evaporator 16 and the heat load 12 to accomplish this heat transfer.

The heat entering the first-loop evaporator 16 evaporates the condensed refrigerant vapor which has entered the first-loop evaporator 16 via the path 20. The effluent of the first-loop evaporator 16, which traverses the path 22, is refrigerant vapor which bears the heat from the heat load 12.

The first-loop absorber 24 receives the refrigerant vapor via the path 22 and contacts it with the less-volatile liquid refrigerant component received from the first-loop generator 26 via the paths 28. The resulting absorption of the refrigerant vapor into the less-volatile refrigerant liquid both condenses the vapor, releasing its heat of vaporization, and releases heat of dissolution as the result of the absorption process. The resulting heat is rejected via the path 30 to the second-loop generator 32. The reconstituted composite refrigerant is passed via the paths 34 through the heat exchanger 35 to the first-loop generator 26. The heat exchanger 35 preheats the composite refrigerant traversing the paths 34 before it enters the generator 26, using heat which otherwise would escape from the generator via the less-volatile refrigerant lines 28.

In the generator 26 of the first loop, the composite refrigerant is heated by the heater 36 sufficiently to distill away the more volatile refrigerant vapor, leaving the less volatile constituent of the refrigerant behind. The refrigerant vapor is delivered via the path 38 to the condenser 40. The less volatile constituent of the refrigerant goes to the first-loop absorber 24 via path 28 (as previously described).

In the first-loop condenser 40, the refrigerant vapor entering via the path 38 is condensed. The heat of condensation is rejected from the first loop, and follows the path 42 to the second-loop generator 32. The condensed refrigerant vapor then exits the first-loop condenser 40 via the path 20 and returns to the first-loop evaporator 16 to complete the first-loop cycle.

Thus, in the first loop, heat from the heat load 12 and the heater 36 enters the loop, and heat leaves the loop from the absorber 24 and condenser 40. Apart from any waste heat which is lost, all the heat taken from the heat load 12 and the heater 36 goes to the second-loop generator 32. A heat exchanger is also conventionally provided to transfer heat from the less-volatile refrigerant in the line 28 leaving the generator 26 to the composite refrigerant in the line 34 entering the generator 26.

Referring now to the right side of FIG. 1, the organization of the second refrigerant loop is essentially identical to that of the first refrigerant loop. The primary differences are in the heat inputs and outputs.

The parts of the second loop are a second-loop evaporator 44, a second-loop absorber 46, a second-loop generator 32, and a second-loop condenser 50. These parts are connected in their operative relationship by a refrigerant vapor condensate line is 52, a refrigerant vapor line 54, composite refrigerant lines 56, less-volatile refrigerant, component lines 58, and a refrigerant vapor line 60.

The heat inputs and outputs of the second loop are as follows. The heat required to operate the second-loop generator 32 comes from the first-loop absorber 24 and condenser 40 via the paths 30 and 42, as previously described. Additional heat from the heat load 12 is received in the second-loop evaporator 44 via the path 48. Heat is rejected from the second-loop absorber 46 and condenser 50 via the paths 62 and 64. Although the paths 62 and 64 are shown as merging, it will be appreciated that separate heat sinks 14 can be provided for the second-loop absorber 46 and the condenser 50. In addition, the reconstituted composite refrigerant is passed via the paths 56 through the heat exchanger 65 to the second-loop generator 32. The heat exchanger 65 preheats the composite refrigerant traversing the paths 56 before it enters the generator 32, using heat which otherwise would escape from the generator 32 via the less-volatile refrigerant lines 58.

Figure 2:
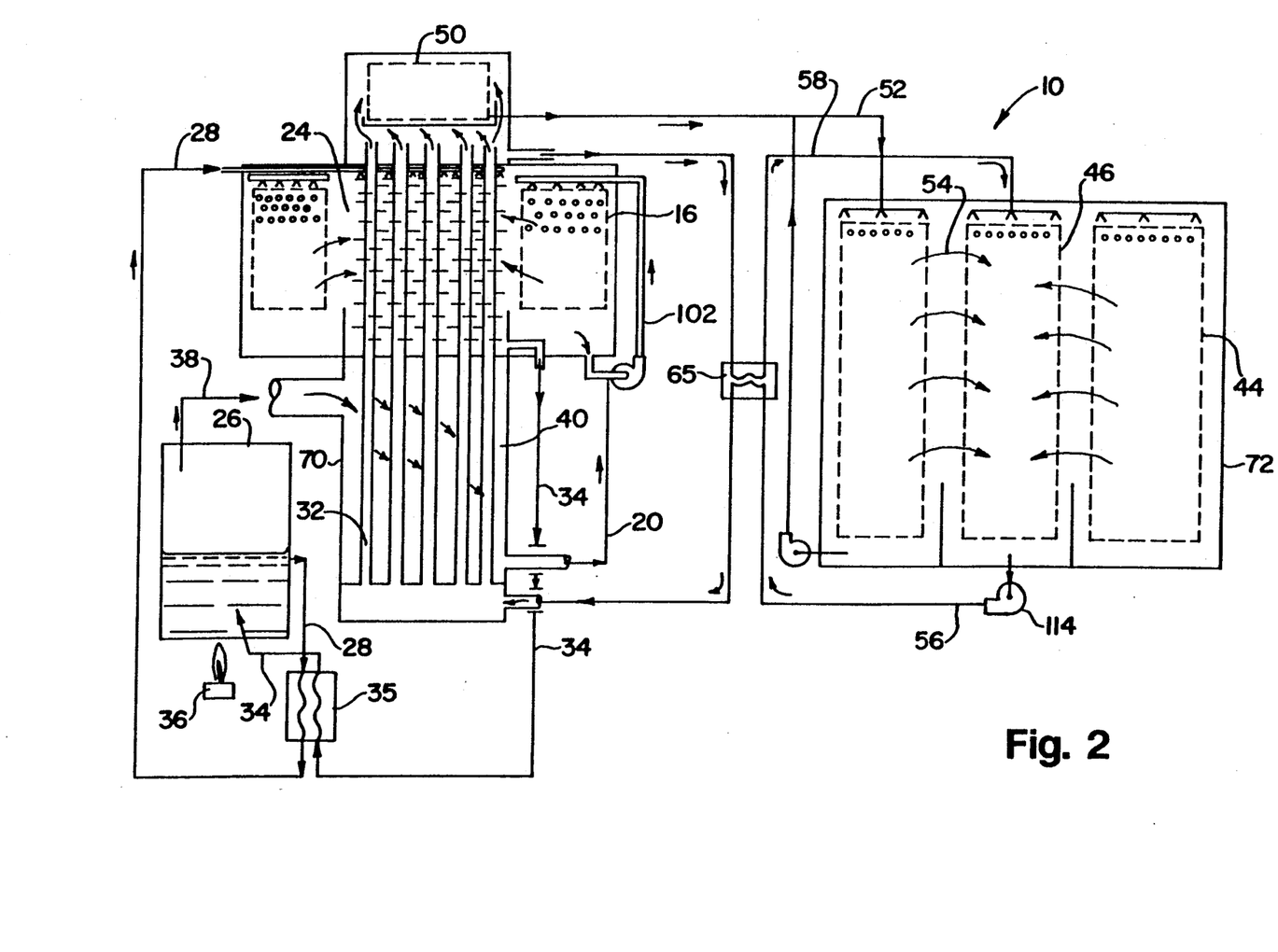
FIG. 2 is a diagrammatic view of the apparatus of the present invention.
Figure 3:
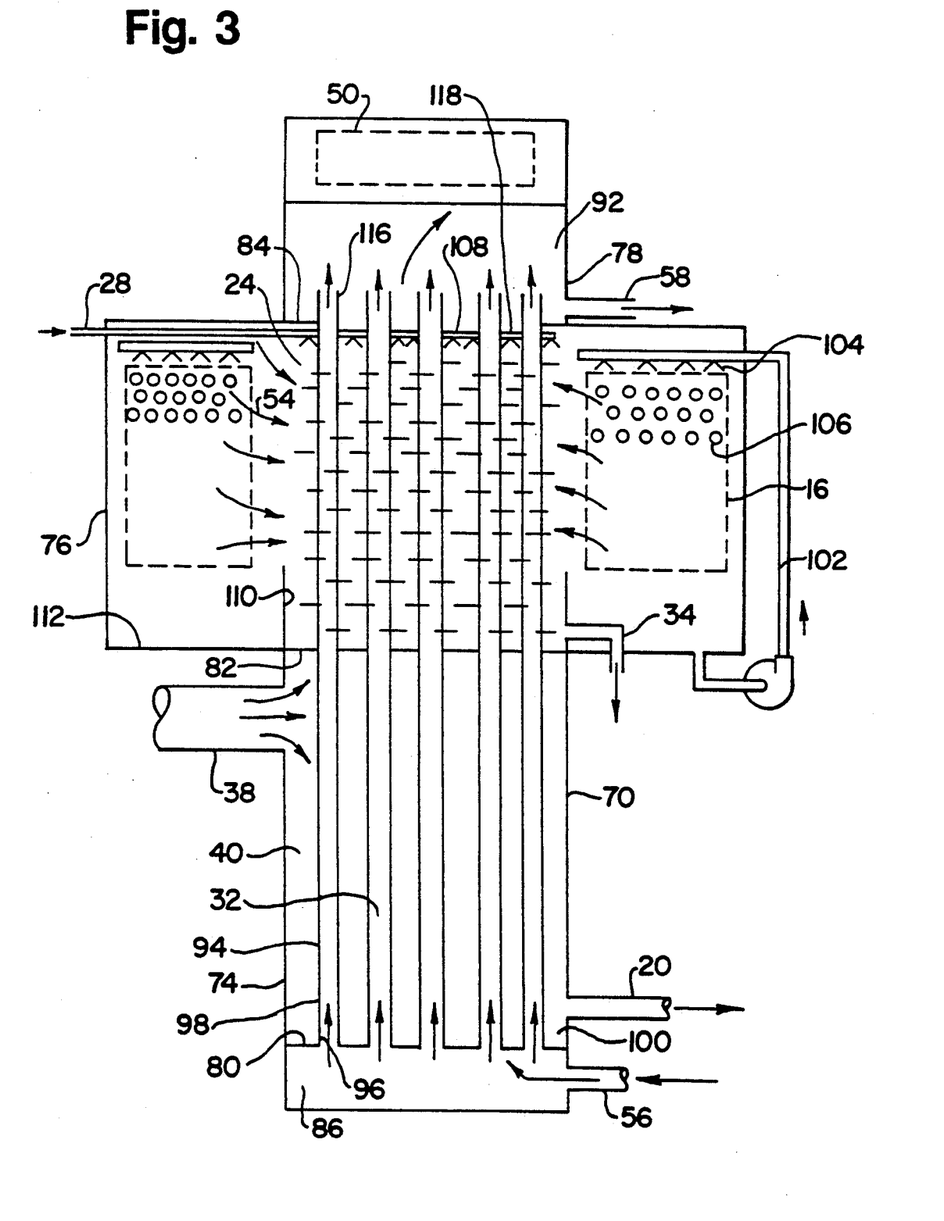
FIG. 3 is a more detailed diagrammatic view of the second-loop generator/first-loop absorber/first-loop condenser vessel illustrated in FIG. 2.

Referring now to FIGS. 2 and 3, apparatus is disclosed which will function as illustrated in FIG. 1. Certain parts of FIGS. 2 and 3 correspond to those of FIG. 1, and thus share identical reference characters.

In the embodiment of FIGS. 2 and 3, the first-loop evaporator 16, the first-loop absorber 24, the first-loop condenser 40, the second-loop generator 32, and the second-loop condenser 50 are all located in a single, subdivided first vessel 70. The first-loop generator 26 is a separate vessel, and the second-loop evaporator 44 and the second-loop absorber 46 are each in a vessel 72. The first-loop generator 26 has not been modified in this embodiment.

Referring now in particular to FIG. 3, the first vessel 70 is made up of a lower cylindrical wall 74, a middle cylindrical wall 76, and an upper cylindrical wall 78. The first vessel defined by the space enclosed by the cylindrical walls 74, 76, and 78 is subdivided by a lower bulkhead 80, a middle bulkhead 82, and an upper bulkhead 84 into a first header or entrance 86, a first-loop condenser (also known herein as a second chamber) 40, a first-loop absorber chamber (also known herein as a first chamber) 24, and a second header or exit 92 arranged in series. The bulkheads 80, 82, and 84 are sealed to the cylindrical walls 74, 76, and 78 to close the first vessel and provide fluid-tight partitions.

A multiplicity of substantially vertical tubes such as 94, each having a cylindrical wall defining an interior surface 96 and an exterior surface 98, provides communication between the first header 86 and the second header 92. These tubes 94 pass through the first-loop condenser (also known as a second chamber) 40 and the first-loop absorber (also known as a first chamber) 24. The bulkheads 80, 82, and 84 also are welded, soldered, or otherwise sealed about the exterior surfaces 98 of the tubes 94 to maintain fluid-tight partitions between the first header 86, the first-loop condenser 40, the first-loop absorber 24, and the second header 92.

The walls of the tubes 94, taken together, define a partition between the first vessel 70 (which is outside the walls of the tubes 94 and between the bulkheads 80 and 84) and the second vessel (which is the sum of all the spaces within the walls of the tubes 94 in the vessel 70 between the bulkheads 80 and 84). The walls of the tubes 94 serve as a heat transfer medium between the first and second vessels. The walls of the tubes 94 are made of a copper alloy or another material which is structurally sound, not readily corroded, essentially liquid and vapor tight, and a good conductor of heat.

More specifically, the space above the lower bulkhead 80, below the middle bulkhead 82, outside the tubes 94, and within the lower cylindrical wall 74 is the first-loop condenser (second chamber) 40. The spaces enclosed by the interior surfaces 96 of the tubes 94 and located within the confines of the first-loop condenser 40 collectively define a first stage of the second-loop generator 32. The portions of the walls of the tubes 94 enclosed within the first-loop condenser 40 define the heat transfer path 42 of FIG. 1.

Above the middle bulkhead 82, below the upper bulkhead 84, outside the tubes 94, and within the middle cylindrical wall 76 is the first-loop absorber or first chamber 24. The spaces enclosed by the interior surfaces 96 of the tubes 94 within the confines of the first-loop absorber 24 collectively define a second stage of the second-loop generator 32. The portions of the walls of the tubes 94 enclosed within the first-loop absorber 24 define the heat transfer path 30 of FIG. 1.

The first-loop condenser 40 has an entrance generally indicated at 38 for receiving refrigerant vapor. The vapor condenses on the exterior surfaces 98 of the tubes 94. The droplets of refrigerant condensate formed on the surfaces 98 run down the tubes 94, due to the influence of gravity, forming a pool of the condensate in the sump 100 at the bottom of the first-loop condenser 40. The condensate is drained via the refrigerant path 20 to the first-loop evaporator 16. In this embodiment, the path 20 merges into the refrigerant recycle path 102.

Since the surfaces 98 of the tubes 94 present a large surface area providing many sites for condensation, the heat of condensation from the is condensing refrigerant vapor in the first-loop condenser 40 is mostly transferred to the tubes 94, and heats the contents of the tubes 94. The condenser 40 thus provides its heat to the contents of the tubes 94.

The first-loop evaporator 16 preferably is an annular assembly located within the boundaries of the cylindrical wall 76 and surrounding the first-loop absorber 24. The condensed refrigerant vapor is delivered to the evaporator 16 from the sump 100 via the line 20 and the refrigerant recycle path 102. The condensate is sprayed through the sprayers 104 over an array of heat-exchange surfaces generally indicated at 106 which make up the first-loop evaporator 16. Water to be chilled (representing the heat load 12 of FIG. 1) or a separate heat exchange fluid is passed through the array 106 to transmit heat from the heat load 12 to the refrigerant vapor condensate. The heat thus accepted re-vaporizes the refrigerant condensate. The vapor produced in the first-loop evaporator 16 fills the interior of the first-loop absorber 24, and is in contact with the surfaces 98 of the tubes 94 between the bulkheads 82 and 84.

While the refrigerant vapor is in contact with the surfaces 98, the low-volatility component of the refrigerant is delivered to the first-loop absorber 24 via the line 28. The low-volatility refrigerant component is conveyed to the top surface of the distributor plate 108. The distributor plate 108 deposits the low-volatility refrigerant component onto the exterior surfaces 98 of the tubes 94. Gravity causes sheets or drops of the less-volatile component of the refrigerant to flow down the exterior surfaces 98.

As this low-volatility refrigerant component flows down the exterior walls 98, the heat already in the low-volatility refrigerant component (which has just been boiled in the first-loop generator 26 to release the volatile component) is transferred to the tubes 94, and thus to their contents. At the same time, the refrigerant vapor generated by the first-loop evaporator 16 is absorbed by the less-volatile refrigerant component flowing down the tubes 94, reforming the original composite refrigerant and releasing a substantial quantity of heat of absorption and condensation. This heat is taken up by the tubes 94, and thus their contents.

The newly-reconstituted composite refrigerant flows down the tubes 94 to the middle bulkhead 82 and collects in the inner sump 110. The contents of the inner sump 110 are drained by the line 34 and returned to the first-loop generator 26. The first-loop evaporator 16 also has an outer sump 112 in which the liquid sprayed onto the array of heat-exchange surfaces 106 of the first-stage evaporator 16, and which fails to evaporate, collects. The liquid refrigerant in the outer sump 112 is recycled via the refrigerant recycle path 102 to the sprayers 104.

Referring to FIG. 3, and occasionally to FIGS. 1 and 2, the second-loop generator 32 of the illustrated embodiment will now be discussed. The composite liquid second-loop refrigerant (which may be the same as or different from the first-loop refrigerant) enters the first header 86 of the second-loop generator 32 via the line 56.

In the first stage of the second-loop generator 32 (within the first-loop condenser 40), the composite refrigerant leaving the second-loop absorber 46 is pumped by the pump 114 (FIG. 2) into the first header 86 and up into the entrances of the tubes 94. Heat is transferred to the composite second-loop refrigerant disposed within the interior surfaces 96 of the tubes 94 from the first-loop refrigerant vapor condensing on the is exterior surfaces 98 of the same tubes 94. Due to a combination of convection and the buoyancy of the refrigerant vapor bubbles formed in the tubes 94, the charge of second-loop composite refrigerant is driven upward within the tubes 94. The vapor bubbles rise particularly rapidly within the tubes 94.

Absorption is taking place on the exterior surfaces 98 of the tubes 94 within the first-stage absorber 24, which encloses the second stage of the second-loop generator 32. The second-loop refrigerant within the interior surfaces 96 of the tubes 94 is further heated by the first-loop absorption taking place adjacent to the exterior surfaces 98 of the same tubes. This heating distills more refrigerant vapor from the less-volatile constituent of the second-loop refrigerant within the tubes 94. The rising bubbles of vapor formed within the interior surfaces 96 expel both themselves and the entrained less-volatile liquid refrigerant through the tops 116 of the tubes 94 and into the second header 92.

Referring now to FIGS. 2 and 3 together, the vapor component of the second-loop refrigerant leaving the tubes 94 is captured by the headspace in the second header 92. The less-volatile liquid constituent of the second-loop refrigerant expelled from the same tubes 94 is deflected to and collects in a sump 118 defined by the top of the upper bulkhead 84. From the sump 118, the less-volatile second-loop refrigerant component is conveyed by the line 58 to the second-loop absorber 46.

In this embodiment, the second-loop condenser 50 is also located within the second header 92. The second-loop condenser 50 throws off heat to the heat sink 14 (FIG. 1), then collects the condensed second-loop refrigerant vapor for transport to the second-loop evaporator 44 via the line 52.

Several distinguishing features of the illustrated apparatus are these. The tubes 94, in aggregate, have a large wall area, providing a high degree of heat exchange between the interior surfaces 96 and exterior surfaces 98 of the tubes 94. Direct heat exchange thus occurs between the first-loop condenser 40 and the second-loop generator 32, as well as between the first-loop absorber 24 and the second-loop generator 32. This provides much more efficient heat exchange than is found when heat is transferred indirectly via a coupling loop with an intermediate fluid, as has been suggested in earlier systems.

Another distinction is that, because the prevailing flow of the condensing vapor within the first-loop condenser 40 is downward, and the flow of the refrigerant within the second-loop generator 26 via the tubes 94 is generally upward, the hottest part of the first-loop condenser contacts the hottest part of the second-loop generator 32, and the coolest fraction of the refrigerant outside the tubes 94 contacts the coolest fraction of the refrigerant within the tubes 94. This counterflow provides for efficient heat transfer.

Still further, the condenser space in this apparatus is outside the tubes 94, as has been the case in prior systems, but unlike prior systems, the second-loop generator space is inside those tubes.

Now addressing the first-loop absorber 24, one difference is that the absorbing process takes place on the exterior surfaces 98 of the tubes 94, while the second-loop generator 32 is located within the very same tubes 94. The walls of the tubes 94 are all that separates the absorber 24 and the generator 32 . This arrangement eliminates the need for a separate heat exchange loop in which a separate heat-exchange fluid is circulated between two heat exchangers, the walls of which respectively define second and third heat-exchange media in the second-loop generator 32 and the first-loop absorber 24.

The present system thus provides a direct heat-exchange relation (i.e. a single heat exchange medium) between the first-loop absorber 24 and the second-loop generator 32, and between the first-loop condenser 40 and the second-loop generator 32. This eliminates both a media (tube wall) and medium (heat exchange fluid), as well as the means for circulating the medium.

Another distinctive feature of the present apparatus is the flow of the less volatile refrigerant for absorption along the outsides of the tubes 94, which are substantially straight and normally vertical ("normally" referring to the orientation of the apparatus in use). The refrigerant flows down the exterior surfaces 98 of the tubes 94 in a very thin, large surface area sheet which provides a large contact area between the less-volatile liquid phase and the vapor phase of the refrigerant. These tubes can have external and/or internal enhancements to provide for greater heat exchange surface area at relatively low cost.

Absorption proceeds more rapidly near the tops of the tubes 94, where the less-volatile liquid refrigerant is relatively unsaturated with the refrigerant vapor. As a result, more heat is generated near the tops of the tubes 94, and less heat is generated near the bottoms of the tubes 94, where the less-volatile phase is nearly saturated with the volatile phase and absorption is much slower. The liquid flowing down the exterior walls 98 and the contents rising within the interior walls 96 of the tubes 94 are in counter-current flow. Heat transfer is thus most efficient.

The vessel 72 containing the second-loop evaporator 44 and the second-loop absorber 46 is somewhat similar to the corresponding apparatus of the first loop. The second-loop evaporator 44 can be annular and can contain the second-loop absorber 46 within it so the refrigerant vapor from the second-loop evaporator 44 is released within the second-loop absorber 46. The illustrated apparatus shows a conventional second-loop absorber 46 with sprayers to subdivide the less volatile liquid refrigerant component.

Many other expedients and variations will suggest themselves to one of ordinary skill in the art. These changes and additions may be carried out without departing from the present invention. For example, the combined first-loop absorber 24 and second-loop generator 32 could be provided in a different vessel than the combined first-loop condenser 40 and second-loop generator 32. Also, depending upon the refrigerant/absorbent combination employed, the first loop absorber and first loop condenser could be vertically interchanged and the second loop generator left unchanged.

Several other examples are as follows. The respective operations taking place inside the interior walls 96 and outside the exterior walls 98 of the tubes 94 could be reversed. Three or more interconnected refrigerant loops could also be employed, within the scope of the present invention. Still further, a supplemental source of heat can be used to heat the first header 86, and thus the refrigerant within it.

Many other expedients will readily suggest themselves to one of one of ordinary skill of the art, in view of the foregoing disclosure.

Thus, plural loop absorption refrigeration apparatus has been shown which has fewer operative parts than previous systems. It is expected that this apparatus will typically be more efficient than prior apparatus, and will cost less, weigh less, take up less space, and waste less heat than prior apparatus. The need to transfer heat indirectly, from one place to another within plural loop absorption refrigeration apparatus has been eliminated. Furthermore, the generator of a lower loop and the absorber of a higher loop have been combined in one outer vessel. Thus, one or more objects of the present invention have been met by the illustrated apparatus.

What is claimed is:

1. Apparatus for transferring heat from a heat load to a heat sink, said apparatus comprising:
   A. a first loop comprising a first generator, a first condenser, a first evaporator, and a first absorber operatively linked together; and
   B. a second loop comprising a second generator, a second condenser, a second evaporator, and a second absorber operatively linked together;
   wherein said first absorber and said second generator are in direct heat exchange relation.

2. The apparatus of claim 1, wherein:
   A. said first absorber and said second generator are defined at least in part by a vessel divided by a heat-conductive medium into at least one first conduit and at least one second conduit in heat exchange contact across said medium;
   B. at least part of said first absorber is disposed within at least one said first conduit, and
   C. at least part of said second generator is disposed within at least one said second conduit.

3. Apparatus comprising:
   A. a first vessel divided by a partition to define a first chamber and a second chamber which do not directly communicate with each other; and
   B. at least one second vessel which is formed from a heat exchange media, has an entrance and an exit, is unobstructed between its entrance and its exit, passes through said first and second chambers, and is in heat exchange contact with each of said first and second chambers via said heat exchange media.

4. The apparatus of claim 3, wherein said at least one second vessel comprises at least one tube.

5. The apparatus of claim 4, wherein said at least one tube has an exterior surface and an interior surface, and said first and second chambers are partially defined by the exterior surface of said at least one tube.

6. The apparatus of claim 5, wherein said first chamber comprises a refrigerant absorber.

7. The apparatus of claim 6, wherein said second chamber comprises a refrigerant condenser.

8. The apparatus of claim 6, wherein said absorber further comprises apparatus for flowing a less-volatile refrigerant component down the exterior of said medium and apparatus for contacting said concentrated liquid refrigerant flowing down the exterior of said medium with a refrigerant vapor.

9. The apparatus of claim 5, wherein said partition is a bulkhead.

10. The apparatus of claim 4, wherein said tube is a substantially straight, normally vertical tube.

11. The apparatus of claim 3, wherein at least one said second vessel is a refrigerant generator.

12. The apparatus of claim 11, wherein said second chamber is a refrigerant condenser.

13. The apparatus of claim 12, wherein said first chamber is a refrigerant absorber.

14. The apparatus of claim 3, wherein said first chamber is a refrigerant absorber.

15. The apparatus of claim 14, further comprising a refrigerant evaporator located in said first chamber.

16. The apparatus of claim 14, wherein said second chamber is a refrigerant condenser.

17. The apparatus of claim 14, wherein at least one said second vessel is a refrigerant generator.

18. The apparatus of claim 3, wherein said second chamber is a refrigerant condenser.

19. Apparatus comprising:
   A. a vessel divided to form a first header, a condenser chamber having an interior portion, an absorber chamber having an interior portion, and a second header physically placed in series; and
   B. a multiplicity of tubes, each having an interior surface and an exterior surface, each said tube passing through said condenser chamber and said absorber chamber, at least some of said exterior surface being exposed to the interior portions of said absorber chamber and said condenser chamber, each said tube communicating between said first header and said second header.

20. The apparatus of claim 19, wherein said condenser defines an entrance for introducing a refrigerant vapor into contact with the exteriors of said tubes and an exit for withdrawing condensed refrigerant vapor.

21. The apparatus of claim 19, wherein said absorber chamber comprises apparatus for flowing a low volatility liquid refrigerant component down the exterior surfaces of said tubes, apparatus for introducing a refrigerant vapor adjacent to the exterior surfaces of said tubes for absorption in said low-volatility liquid refrigerant to form a composite liquid refrigerant, and apparatus for removing said composite liquid refrigerant from said absorber.

22. The apparatus of claim 21, wherein said apparatus for introducing a refrigerant vapor comprises an evaporator for generating said refrigerant vapor.

23. The apparatus of claim 22, wherein said evaporator is disposed within said absorber chamber.

24. The apparatus of claim 22, wherein said evaporator is annular, and surrounds said tubes within its inner diameter.

25. The apparatus of claim 19, wherein said tubes are normally oriented substantially vertically.

26. The apparatus of claim 3, wherein said at least one second vessel is not in fluid communication with said first and second chambers.

* * * * *

REEXAMINATION CERTIFICATE (2884th)

United States Patent [19]
Keuper et al.

[11] B1 5,284,029
[45] Certificate Issued  May 14, 1996

[54] TRIPLE EFFECT ABSORPTION HEAT EXCHANGER COMBINING SECOND CYCLE GENERATOR AND FIRST CYCLE ABSORBER

[75] Inventors: Edward F. Keuper, La Crosse, Wis.; William J. Plzak, La Crescent, Minn.

[73] Assignee: Gas Research Institute, Chicago, Ill.

Reexamination Request:
No. 90/003,442, May 25, 1994

Reexamination Certificate for:
Patent No.: 5,284,029
Issued: Feb. 8, 1994
Appl. No.: 945,021
Filed: Sep. 15, 1992

[51] Int. Cl.⁶ .................................... F25B 15/00
[52] U.S. Cl. .................. 62/476; 62/101; 62/79
[58] Field of Search ............................. 165/140

[56] References Cited

U.S. PATENT DOCUMENTS

| | | | |
|---|---|---|---|
| 714,703 | 12/1902 | Ibert | 165/140 |
| 3,990,263 | 11/1976 | Ainbinder et al. | 62/476 |
| 4,477,396 | 10/1984 | Wilkinson | 261/140 R |
| 4,921,515 | 5/1990 | Dao | 62/335 |

FOREIGN PATENT DOCUMENTS 674460  4/1939  Germany .

OTHER PUBLICATIONS

D. A. Kourmenos et al., Performance of a Solar Driven Compound NH₃/H₂O/LiBr Absorption Refrigeration System in Athens, 685–697.

*Primary Examiner*—Henry A. Bennett

[57] ABSTRACT

Triple-effect absorption heat exchange apparatus for transferring heat from a heat load to a heat sink. The apparatus comprises first and second interconnected refrigerant loops. The first loop comprises a first generator, a first condenser, a first evaporator, and a first absorber operatively linked together. The second loop comprises a second generator, a second condenser, a second evaporator, and a second absorber operatively linked together. The first absorber and the first condenser are in direct heat exchange relation with the second generator. This direct heat exchange relation may be established by providing a two-stage generator in which the condenser and absorber of a first loop are in the same vessel as the generator of a second loop. The condenser and absorber of the first loop provide the heat necessary to operate the second-loop generator. The preferred generator comprises a first vessel divided by a partition into first and second chambers and at least one second vessel made of a heat-conductive media. The first and second vessels are in heat exchange contact across the medium. Each second vessel has an entrance and an exit, is unobstructed between its entrance and its exit, and passes through the first chambers vessels.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 19-26 is confirmed.

Claim 14 is cancelled.

Claims 1, 2, 3, 6, 11, and 15-18 are determined to be patentable as amended.

Claims 4, 5, 7-10, 12 and 13, dependent on an amended claim, are determined to be patentable.

New claims 27 and 28 are added and determined to be patentable.

1. Apparatus for transferring heat from a heat load to a heat sink, said apparatus comprising:
   A. a first loop comprising a first generator, a first condenser, a first evaporator, and a first absorber operatively linked together; and
   B. a second loop comprising a second generator, a second condenser, a second evaporator, and a second absorber operatively linked together, *said second generator having an upstream portion and a downstream portion and being adapted to pass fluid sequentially through said upstream portion, then through said downstream portion;*
   wherein said *second generator, said first condenser, and said* first absorber [and] *are formed in a single vessel; one of said first absorber and first condenser is disposed in direct heat exchange relation with the upstream portion of* said second generator; *and the other of said absorber and condenser is disposed* [are] in direct heat exchange relation *with the downstream portion of said second generator.*

2. The apparatus of claim 1, wherein:
   A. said first absorber and said second generator are defined at least in part by [a vessel divided by] *a wall made of* a heat-conductive [medium] *media* and dividing *said single vessel* into at least one first conduit and at least one second conduit in heat exchange contact across said [medium] *media*;
   B. at least part of said first absorber is disposed within at least one said first conduit, and
   C. at least part of said second generator is disposed within at least one said second conduit.

3. Apparatus comprising:
   A. a first vessel divided by a partition to define a first chamber and a second chamber which do not directly communicate with each other, *wherein said first chamber comprises a refrigerant absorber;* and
   B. at least one second vessel which is formed from a heat exchange media, has an entrance and an exit, is unobstructed between its entrance and its exit, passes through said first and second chambers, and is in heat exchange contact with each of said first and second chambers via said heat exchange media.

6. [The apparatus of claim 5] *Apparatus comprising:*
   A. *a first vessel divided by a partition to define a first chamber and a second chamber which do not directly communicate with each other, wherein said first chamber comprises a refrigerant absorber; and*
   B. *at least one second vessel comprising at least one tube which is formed from a heat exchange media, has an entrance and an exit, is unobstructed between its entrance and its exit, passes through said first and second chambers, and is in heat exchange contact with each of said first and second chambers via said heat exchange media;*
   *wherein said at least one tube has an exterior surface and an interior surface, and said first and second chambers are partially defined by the exterior surface of said at least one tube.*

11. [The apparatus of claim 3] *Apparatus comprising:*
    A. *a first vessel divided by a partition to define a first chamber and a second chamber which do not directly communicate with each other; and*
    B. *at least one second vessel which is formed from a heat exchange media, has an entrance and an exit, is unobstructed between its entrance and its exit, passes through said first and second chambers, and is in heat exchange contact with each of said first and second chambers via said heat exchange media, wherein at least one said second vessel is a refrigerant generator.*

15. The apparatus of claim [14] *3*, further comprising a refrigerant evaporator located in said first chamber.

16. The apparatus of claim [14] *3*, wherein said second chamber is a refrigerant condenser.

17. The apparatus of claim [14] *3*, wherein at least one said second vessel is a refrigerant generator.

18. [The apparatus of claim 3] *Apparatus comprising:*
    A. *a first vessel divided by a partition to define a first chamber and a second chamber which do not directly communicate with each other, wherein said second chamber is a refrigerant condenser; and*
    B. *at least one second vessel which is formed from a heat exchange media, has an entrance and an exit, is unobstructed between its entrance and its exit, passes through said first and second chambers, and is in heat exchange contact with each of said first and second chambers via said heat exchange media.*

27. *Apparatus comprising:*
    A. *a first vessel divided by a partition to define a first chamber and a second chamber which do not directly communicate with each other, wherein said first chamber comprises a refrigerant condenser; and*
    B. *at least one second vessel which is formed from a heat exchange media, has an entrance and an exit, is unobstructed between its entrance and its exit, passes through said first and second chambers, and is in heat exchange contact with each of said first and second chambers via said heat exchange media.*

28. *Apparatus for transferring heat from a heat load to a heat sink, said apparatus comprising:*
    A. *a first loop comprising a first generator, a first condenser, a first evaporator, and a first absorber operatively linked together, wherein said first absorber is located above said first condenser; and*
    B. *a second loop comprising a second generator, a second condenser, a second evaporator, and a second absorber operatively linked together;*
    *wherein said first absorber and said first condenser are in direct heat exchange relation with said second generator.*

* * * * *